Nov. 12, 1929. J. L. MacCARTHY 1,735,403
SIGNALING DEVICE
Original Filed Feb. 3, 1926 2 Sheets-Sheet 1

Inventor
James L. MacCarthy
By his Attorneys
Kenyon & Kenyon

Nov. 12, 1929.  J. L. MacCARTHY  1,735,403
SIGNALING DEVICE
Original Filed Feb. 3, 1926  2 Sheets-Sheet 2
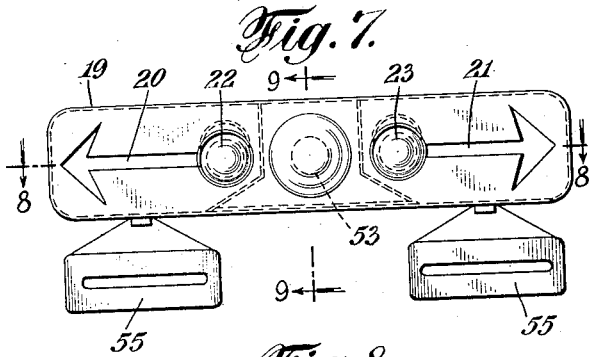//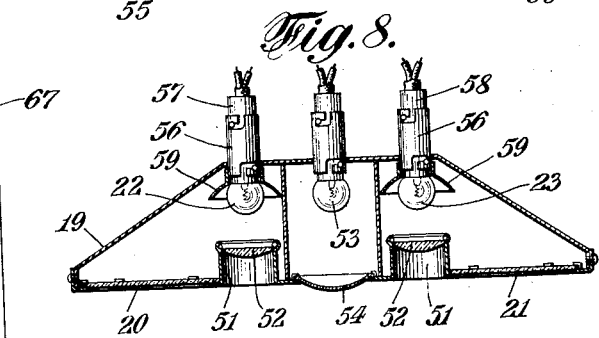//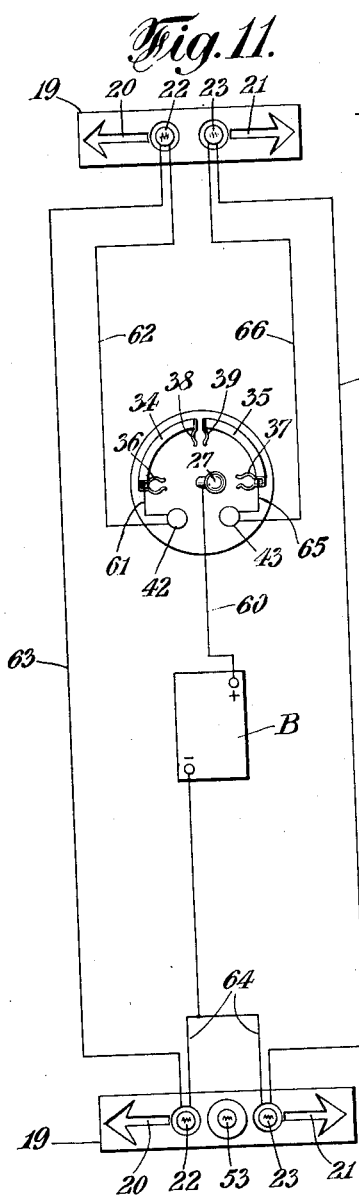//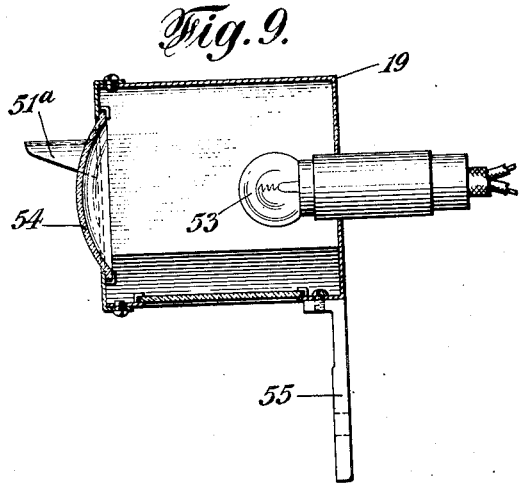//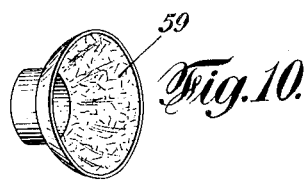

Patented Nov. 12, 1929

1,735,403

UNITED STATES PATENT OFFICE

JAMES L. MacCARTHY, OF BROOKLYN, NEW YORK

SIGNALING DEVICE

Application filed February 3, 1926, Serial No. 85,685. Renewed March 26, 1929.

This invention relates to signaling devices and more especially to signaling devices for use on automobiles.

An object of this invention is a signal visible under all conditions to indicate the action the driver is about to take together with a simplified easily operable control mechanism which also indicates to the driver that the signal has been properly operated.

One way of obtaining this object is by providing translucent indicators at the rear, front or both of an automobile, which indicators may be illuminated selectively by electric lamps controlled by a switch mounted near the steering wheel. In the switch and in series with the above mentioned lamps are provided electric lamps, the lighting of which indicates that the corresponding indicator is illuminated.

Other objects, novel features and advantages will be apparent from the following description and accompanying drawings which disclose a specific embodiment of the invention and wherein Figure 1 is a perspective view showing the mounting of the switch near the steering wheel.

Figure 7 is a rear elevation of signal housing.

Figure 8 is a section on line 8—8 of Figure 7.

Figure 9 is a section on line 9—9 of Figure 7.

Figure 10 is a detail of the reflector for the signal lamps and

Figure 11 is a wiring diagram.

Figure 1:
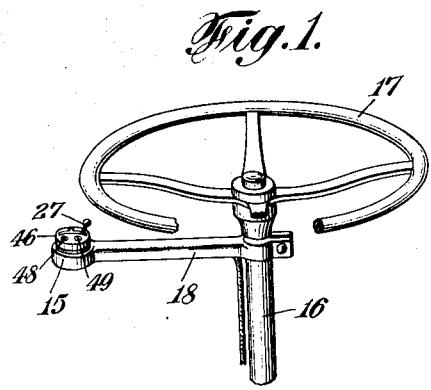
Figure 2:
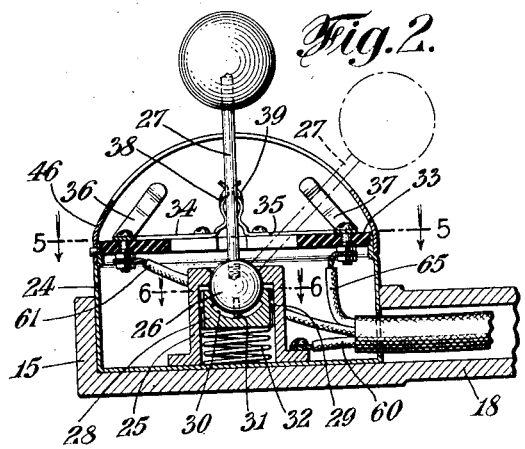
Figure 2 is a vertical section through the switch taken on the line 2—2 of Figure 4.
Figure 3:
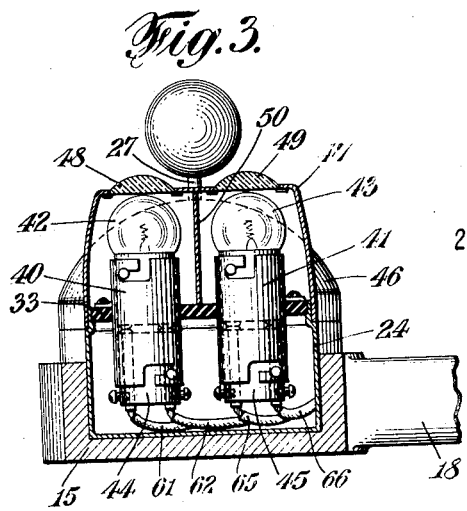
Figure 3 is a vertical section on the line 3—3 of Figure 4.
Figure 4:
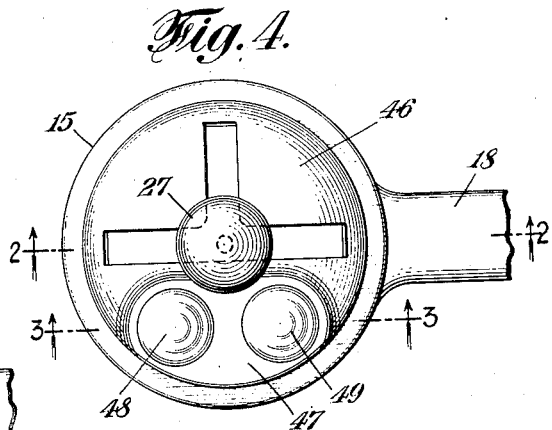
Figure 4 is a plan view of the switch.
Figure 6:
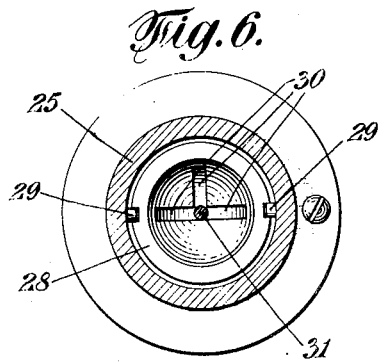
Figure 6 is a section on line 6—6 of Figure 2.
Figure 5:
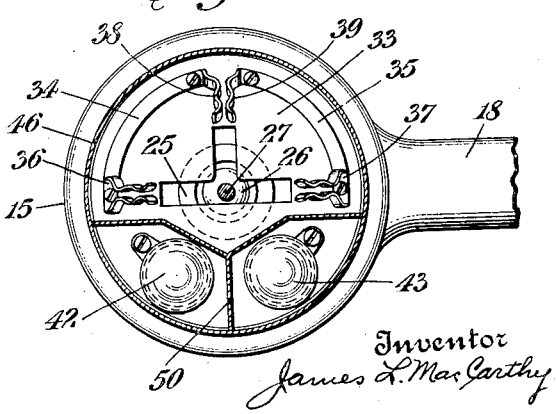
Figure 5 is a section on line 5—5 of Figure 2.

The switch 15 is supported from the steering post 16 near the rim of the steering wheel 17 by a bracket 18. Signal boxes or casings 19 are attached to the front and rear of an automobile in any desired manner. In the face of each box 19 are provided two glass covered direction indicating apertures 20 and 21 with the indicators pointing in opposite directions. Electric lamps 22 and 23 are provided to illuminate the indicators and are controlled by the switch 15 through electrical connections later to be described.

The switch 15 comprises a box 24 to the bottom of which is attached a binding post comprising a sleeve 25 having a lip at its upper end to receive a ball 26 to which is attached a lever 27. A block 28 is reciprocally mounted in the sleeve 25 and is guided by pins 29 fitting in grooves in the block, thereby preventing rotation of the block. It is apparent that the block 28 may be prevented from rotating in many other ways. The upper face of the block 28 is recessed to receive the ball 26 and is provided with grooves 30 to receive a finger 31 formed on the ball 26. A spring 32 is interposed between the block 28 and the bottom of the box 24 and serves to maintain the block 28 in contact with the ball 26. The finger 31 and grooves 30 cooperate to guide the lever 26 into and out of engagement with contact members later to be described. The spring 32 is of sufficient strength that it will maintain the lever 27 in any position that it is set. The lever therefore has no neutral position to which it must return when disengaged from the contact members and will not be moved by vibration from the position in which it is put.

An annular shelf 33 of insulating material is arranged in the box 24 just above the sleeve 25. Mounted on the shelf 33 are a pair of contact members 34 and 35. These contact members comprise segments which are provided at one end with clips 36 and 37 to receive the lever 27 and at their other ends with fingers 38 and 39 forming a clip to receive the lever 27. The members 34 and 35 are electrically insulated from each other except when the lever 27 is received in the clip formed by the fingers 38 and 39.

In the shelf 33 are mounted two connectors 40 and 41 having bayonet joint sockets in either end. In the upper sockets are provided electric lamps 42 and 43. In the lower sockets are provided plugs 44 and 45 having contacts to engage the terminals of the lamps 42 and 43.

A cover 46 is provided for the box and is formed with an offset portion 47 over the lamps 42 and 43. Directly over the lamps are provided lenses 48 and 49 through which light shines from the lamps 42 and 43, a partition 50 being arranged between the lamps. In the main body of the cover are provided slots in which the lever 27 may be passed when being moved into or out of engagement with the clips on the contact members 34 and 35. These slots in no way act as guides for the lever 27 which is guided in its movements by the finger 31 on the ball 26 traversing the grooves 30 in the block 28.

The signal boxes 19 are made of sheet metal and are trapezoidal in horizontal cross-section as shown in Fig. 8. The rear wall is just long enough to accommodate the lamps mounted in it whereas the front wall is at least twice as long. The front wall is cut away to provide two oppositely directed indicator apertures 20 and 21, and a pane of glass is provided to cover each aperture. At the tail of each indicator there is mounted in the box a substantially cylindrical member 51 projecting into the box and in the inner end of which is mounted a bull's eye lens 52. A hood 51ª, which may constitute a continuation of the member 51 projects from the face of the box 19. In the rear box 19 is provided the usual tail lamp 53 which is separated from the other lamps by partitions the lower portions of which diverge and a bull's eye lens 54 is provided for this lamp. Brackets 55 depend from the box 19 to support a license plate which is illuminated from the lamp 53 through a glass pane in the bottom of the box 19. The lamps 22 and 23 are supported in connectors 56 having bayonet slot sockets in each end. Plugs 57 and 58 are provided to establish electrical connection with the lamps 22 and 23. From the inner ends of the connectors 56 are supported reflectors 59 which comprise metal cups lined with crinkled tin foil or the like. An ordinary sheet of foil is crumpled in any manner to produce a large number of small irregular surfaces. The crumpled foil is then pasted in the cup.

The crinkled reflectors diffuse the light from the lamps 22 and 23. The sloping sides of the box 19 reflect light through the apertures in the face of the box. The lenses 52 are set in the members 51 and by virtue of the heading effect thereof the lamps 22 and 23 are clearly visible regardless of light conditions.

The diagram in Fig. 11 discloses the wiring for connecting front and rear signal lamps and the switch starting from the positive pole of the battery B, a wire 60 runs to the sleeve 25. This wire may be electrically connected with either of the contact members 34 and 35 by moving the lever 27 into engagement with either of the clips 36 and 37, as the sleeve 25, ball 26 and lever 27 are all electrical conductors and the spring 32 maintains the ball and sleeve in contact. The wire 60 may be electrically connected with both contact members 34 and 35 by moving the lever 27 between the fingers 38 and 39. The contact member 34 is connected to one terminal of the plug 44 by a wire 61. A wire 62 connects the other terminal of plug 44 with one terminal of plug 57 in the front signal box, the other terminal of which is connected to one terminal of plug 57 in the rear signal box by wire 63. The other terminal of the plug 57 is connected by a wire 64 to the negative pole of battery B. Similar connecting wires 65, 66, 67 are provided for the other circuit. Thus if the lever 27 be thrown into the clip 36, the lamps 42 and 22 will be lighted. If the lever 27 be thrown into contact with the clip 37, the lamps 43 and 23 will be lighted. If it is thrown into contact with the fingers 38 and 39 all the lamps will be lighted. The lamps 42 and 43 on the switch 15 operate as telltales to indicate whether the other lamps are lighted for if any signal lamp does not light when the switch is thrown into position to close the circuit of that lamp, the tell-tale lamp will not light.

If the driver is about to turn left or right, he operates the lever 27 to illuminate the arrow pointing left or right. If he is about to stop he moves the lever between the fingers 38 and 39 thereby illuminating both arrows. The lenses 52 and also the lenses 42 and 43 may be of the same or different color as desired.

While double contact lamps are shown, the device is equally adaptable for single contact bulbs. By replacing the double contact plugs with single contact plugs, single contact lamps may be used instead of double contact lamps.

Although, the invention has been disclosed in its applicability to indicators for use on automobiles it is apparent that it is of equal applicability to any other type of signaling device. It is, of course, understood that various modifications may be made in the structure without in any way departing from the spirit of the invention set forth in the appended claims.

What I claim and desire to secure by Letters Patent of the United States is:

1. A switch comprising a sleeve having a lip, a lever having a ball contacting with said lip, a block in said sleeve engaging said ball, contact members, and cooperating means on said ball and block to guide said lever into engagement with said contact members.

2. A switch comprising a sleeve having a lip, a lever having a ball contacting with said lip, a block in said sleeve engaging said ball, means to prevent rotation of said block in said sleeve, contact members, and cooperating means on said ball and block to guide said lever into engagement with said contact members.

3. A switch comprising a binding post, a lever, a ball and socket connection between said lever and binding post, contact members, a block engaging the ball of said ball and socket connection, and cooperating means on said ball and block to guide said lever into engagement with said contact members.

4. A switch comprising a sleeve having a lip, a lever having a ball contacting with said lip, a block engaging said ball, contact members and cooperating means on said ball and block comprising a pin on one member and a groove in the other member to guide said lever into engagement with said contact members.

5. A switch comprising a binding post, a lever, a ball and socket connection between said lever and binding post, contact members, a block engaging the ball of said ball and socket connection, and cooperating means on said ball and block comprising a pin on one member and a groove in the other member to guide said lever into engagement with said contact members.

6. A switch comprising a sleeve having a lip, a lever having a ball contacting with said lip, a block slidably mounted in said sleeve to engage said ball, contact members, cooperating means on said ball and block comprising a pin on one member and a groove in the other member to guide said lever into engagement with said contact members, and resilient means for maintaining said block in contact with said ball.

7. A switch comprising a sleeve having a lip, a lever having a ball contacting with said lip, a block slidably mounted in said sleeve to engage said ball, means to prevent rotation of said block, resilient means normally maintaining said block in contact with said ball, contact members and cooperating means on said ball and block to guide said lever into engagement with said contact members.

8. A switch comprising a sleeve having a lip, a lever having a ball contacting with said lip, a block slidably mounted in said sleeve to engage said ball, means to prevent rotation of said block, resilient means normally maintaining said block in contact with said ball, contact members and cooperating means on said ball and block comprising a pin on one member and a groove in the other member to guide said lever into engagement with said contact member.

9. A switch comprising a sleeve having a lip, a lever having a ball contacting with said lip, a block slidably mounted in said sleeve to engage said ball, a pin on said block engaging a groove in said sleeve, resilient means for maintaining said block in contact with said ball, contact members and a pin on said ball engaging a groove in said block to guide said lever into engagement with said contact members.

10. A switch comprising a binding post, a lever, a ball and socket connection between said lever and binding post, contact members, a block engaging the ball of said ball and socket connection, cooperating means on said ball and block comprising a pin on one member and a groove in the other member to guide said lever into engagement with said contact members, and resilient means for maintaining said block in contact with said ball.

In testimony whereof, I have signed my name to this specification.

JAMES L. MacCARTHY.